United States Patent [19]

Shishido

[11] Patent Number: 5,842,146
[45] Date of Patent: Nov. 24, 1998

[54] METHOD AND APPARATUS OF SETTING CLOCK TIME AND USING TIME DATA IN A VEHICLE NAVIGATION SYSTEM

[75] Inventor: Kan Shishido, Tochigi, Japan

[73] Assignee: Honda Giken Kogyo Kabushiki Kaisha, Tokyo, Japan

[21] Appl. No.: 644,869

[22] Filed: May 10, 1996

[51] Int. Cl.⁶ .................................................. G01C 21/00
[52] U.S. Cl. ...................... 701/210; 701/213; 340/988
[58] Field of Search ..................... 364/443, 446, 364/449.1, 449.7, 449.8, 467; 342/357, 352, 356, 450, 457; 379/58; 340/989, 988, 991, 993; 701/23, 24, 25, 26, 36, 200, 201, 202, 204, 207, 208, 209, 210, 211, 213, 214

[56] References Cited

U.S. PATENT DOCUMENTS

| | | | |
|---|---|---|---|
| 4,731,613 | 3/1988 | Endo et al. | 342/357 |
| 4,796,191 | 1/1989 | Honey et al. | 364/450 |
| 4,914,605 | 4/1990 | Loughmiller, Jr. et al. | 364/518 |
| 5,072,395 | 12/1991 | Bliss et al. | 364/443 |
| 5,107,433 | 4/1992 | Helldörfer et al. | 364/444 |
| 5,177,685 | 1/1993 | Davis et al. | 364/443 |
| 5,247,440 | 9/1993 | Capurka et al. | 364/424.05 |
| 5,311,195 | 5/1994 | Mathis et al. | 342/357 |
| 5,337,244 | 8/1994 | Nobe et al. | |
| 5,365,450 | 11/1994 | Schuchman et al. | 364/449 |
| 5,369,588 | 11/1994 | Hayami et al. | 364/449 |
| 5,497,508 | 3/1996 | George | 455/161.2 |
| 5,519,403 | 5/1996 | Bickley et al. | 342/352 |
| 5,521,887 | 5/1996 | Loomis | 368/47 |
| 5,555,286 | 9/1996 | Tendler | 379/59 |
| 5,625,668 | 4/1997 | Loomis et al. | 379/58 |
| 5,627,548 | 5/1997 | Woo et al. | 342/357 |
| 5,640,452 | 6/1997 | Murphy | 380/5 |

*Primary Examiner*—William A. Cuchlinski
*Assistant Examiner*—Edward Pipala
*Attorney, Agent, or Firm*—Lyon & Lyon LLP

[57] ABSTRACT

A clock time adjustment system for a vehicle equipped with navigation system whereby the time on the system clock is adjusted based upon position of the vehicle and the time signal provided by the Global Positioning Satellite System (GPS). The navigation system is capable of determining vehicle position and the system memory is provided with data corresponding to regional time zones. The system determines the current position of the vehicle and then calculates the proper time for the vehicle's location using data corresponding to the regional time zone where the vehicle is currently located. The system also stores, into memory, road data having routes that are undesirable for travel at particular times which may then be used to adjust the trip route to the destination by comparing the road data and time to determine an optimal route that avoids roads that are undesirable for traveling during a specific period.

15 Claims, 5 Drawing Sheets

FIG. 7

METHOD AND APPARATUS OF SETTING CLOCK TIME AND USING TIME DATA IN A VEHICLE NAVIGATION SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The field of the present invention relates to navigation systems for vehicles and more particularly to a method and apparatus setting clock time and using time data to control various system operations.

In the typical navigation system, the user selects the destination by inputting the destination address, namely the input data consisting of street number, street name, city/town, and state or other region. In practice, the user is presented with one or more screens containing input fields for entry of the destination input data. Once the destination has been inputted, the system calculates the travel route and displays the route to the user.

The navigation system contains a route calculation protocol which determines how the route is calculated. Various factors are used in determining the trip route calculated by the system. The present inventor has recognized that time can be an important factor in how the system calculates trip route.

SUMMARY OF THE INVENTION

The present invention is directed to a method and apparatus for a vehicle navigation system whereby system time is adjusted based upon position of the vehicle and the time signal provided by the Global Positioning Satellite System. The navigation system is capable of determining vehicle position. System memory is provided with data corresponding to regional time zones. By determining the current position of the vehicle, the system calculates the proper time for the vehicle's location using data corresponding to regional time zones. In a preferred method, the system stores, into memory, road data having routes that are undesirable for travel at particular times which may then be used to adjust the trip route to the destination by comparing the road data and time to determine an optimal route that avoids roads that are undesirable for traveling during a specific period.

DETAILED DESCRIPTION OF THE PREFERRED EMBODIMENTS

The preferred embodiments of the present invention will now be described with reference to the drawings. To facilitate description, any identifying numeral representing an element in one figure will represent the same element in any other figure.

Figure 1:
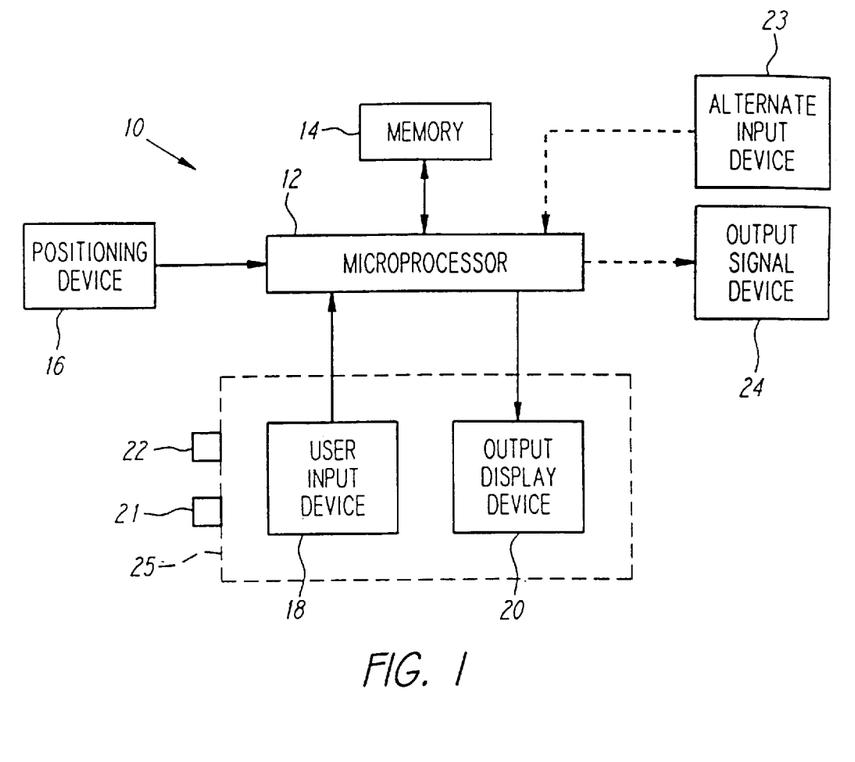
FIG. 1 is schematic of a navigation system such as may be implemented by the present invention.

FIG. 1 illustrates the elements of a navigation system 10 which may be implemented with the input system according to the present invention. The heart of the navigation system 10 is the microprocessor or computer 12 which receives data from the positioning location device 16 and data from its memory 14 to ascertain the current location of the vehicle whether it is moving or stationary. The positioning device preferably may comprise input from any suitable source, such as a Global Positioning Satellite System (GPS), travel path reckoning system or a combination thereof. GPS signal also provides input of Greenwich Mean Time (standard time) as will be described below. The time data may be used to calibrate and adjust clock time in the vehicle. The memory 14 provides data of map information comprising a database of map locations, streets, places, traffic pattern, control data, regional time zone data and other suitable information. The microprocessor 12 may output display information to the display device 20, preferably comprising a liquid crystal display screen on which the system may display various information to the user including area maps, travel route, destination, route instructions, or other information.

Information and control commands are input by a user input device 18. The input device 18 may be a keyboard, a touch screen, one or more switches, pointing or control device such as a joystick or mouse, or combinations thereof. In its preferred form, the output display device 20 and the user input device 18 are combined in a touch activated display screen 25 as part of a control panel including switches 21, 22 located on the dashboard of the vehicle. The system 10 may include an alternate or supplemental input device 23, comprising, for example, a voice activation system, as is known in the art, for inputting commands into the system. The system 10 also preferably includes an output signal device 24 which may provide, for example, an audio output of route instructions. By providing audible instructions, the user can concentrate entirely on the road and receive complete route instructions without having to view the display device 20.

Figure 2:
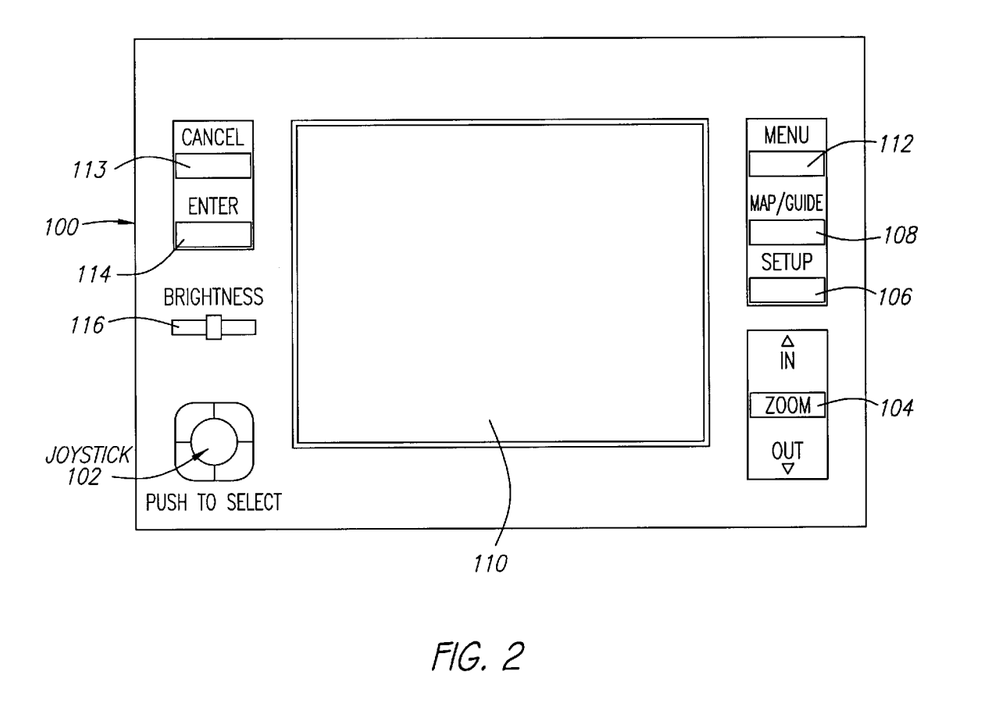
FIG. 2 is a front plan view of a display panel for a navigation system according to the present invention.

FIG. 2 illustrates a preferred control panel 100 comprised of a touch display screen 110 and a plurality of switches which accommodates both visual display and user input for the system. The navigation system starts booting up as soon as the vehicle engine is turned on. Upon bootup, the display screen 110 is activated; if the user does not commence an operation within 30 seconds, the screen 110 switches to an off or sleep mode which may be activated by the user touching the screen 110, the joystick 102 or any of the switches 104–116. The joystick 102, the zoom switch 104, the cancel switch 113 and the enter switch 114 assist in inputting information and controlling various aspects for the navigation system.

The set up switch.106, the mapguide switch 108, and the menu switch 112 each initiate specific display screens for permitting input into the system. A preferred input system is, described in detail in co-pending U.S. application Ser. No. 08/644,852 filed May 10, 1996 under attorney docket no.

215/287 entitled METHOD AND APPARATUS FOR DESTINATION INPUT IN A VEHICLE NAVIGATION SYSTEM herein incorporated by reference.

Figures 3, 4:
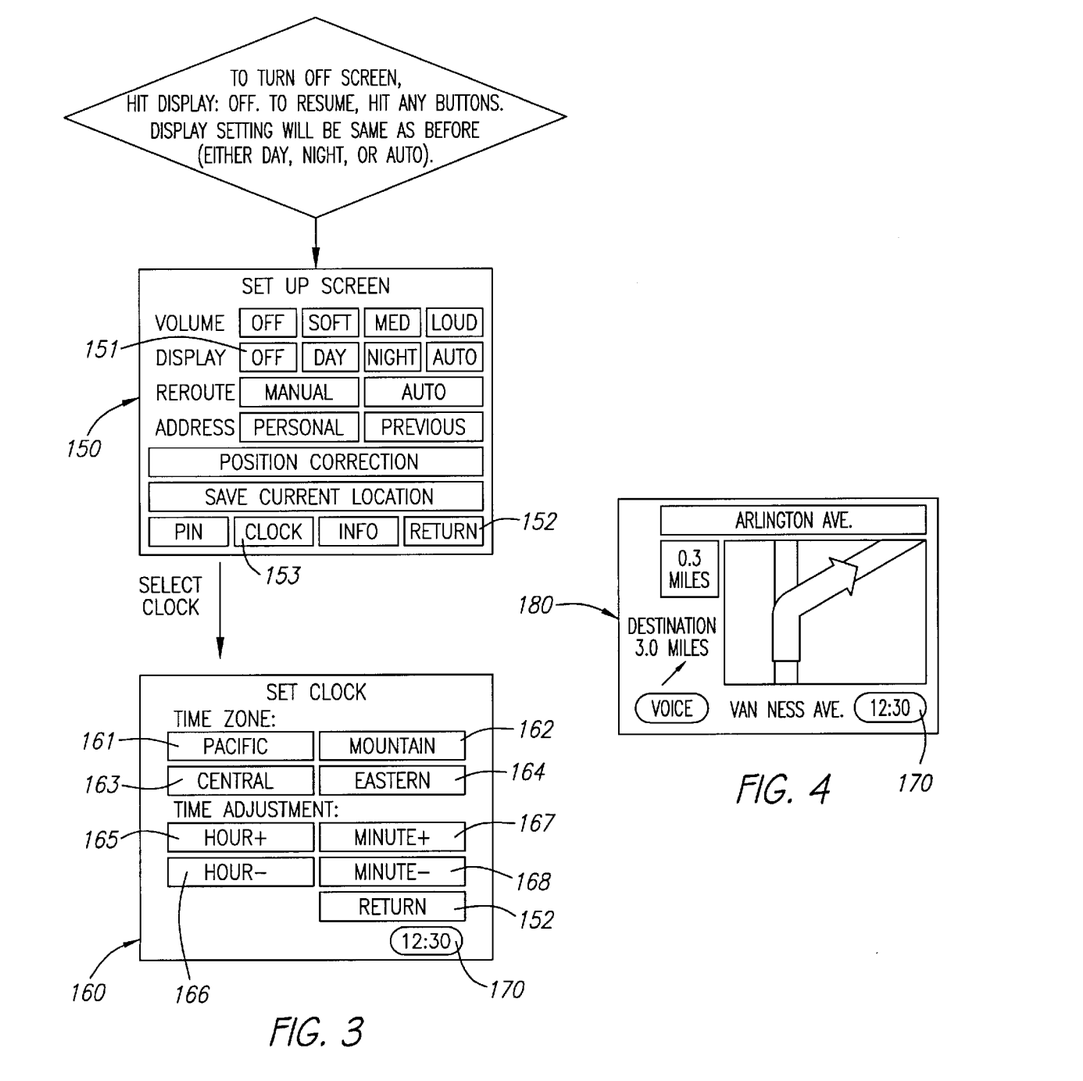
FIG. 3 is a descriptive flow chart illustrating system setup and clock setting protocol.
FIG. 4 is a diagrammatic representation of a screen display illustrating a map guide and time output.

By actuating the set up switch 106, the set up screen 150 of FIG. 3 is brought up on the display 110. By touching the various positions on the set up screen 150, the respective commands may be input into the system. For example, the display may be turned off by actuating the "OFF" key 151 to return the system to the sleep mode to be reactivated upon touching of the screen 110 or one of the switches 102–116. The various functions are actuated by touching the desired command and the current settings are indicated by the shaded sections. The display may be returned to the previous screen by pressing the return key 152 in the lower right hand corner.

Actuating the clock key 153 causes the system to display the Set Clock screen 160. This screen illustrates the four time zones corresponding to the region of the vehicle. Since this vehicle is expected to be located in the United States, there are four time zones indicated namely Pacific 161, Mountain 162, Central 163, Eastern 164. The system may be provided with other regional data if the vehicle is to be taken out of the expected region. Alternatively, the group of time zones illustrated may be automatically chosen by the system using the position determined by the navigation system. The screen 160 is also provided with time adjustment keys 165–168. The user may adjust the time zone and the clock time by pressing the appropriate keys. A clock display 170 appears in the lower corner of the screen 160 providing display of current time.

The same clock display 170 may also appear on other screens such as the map guide screen 180 shown in FIG. 4.

Figure 5:
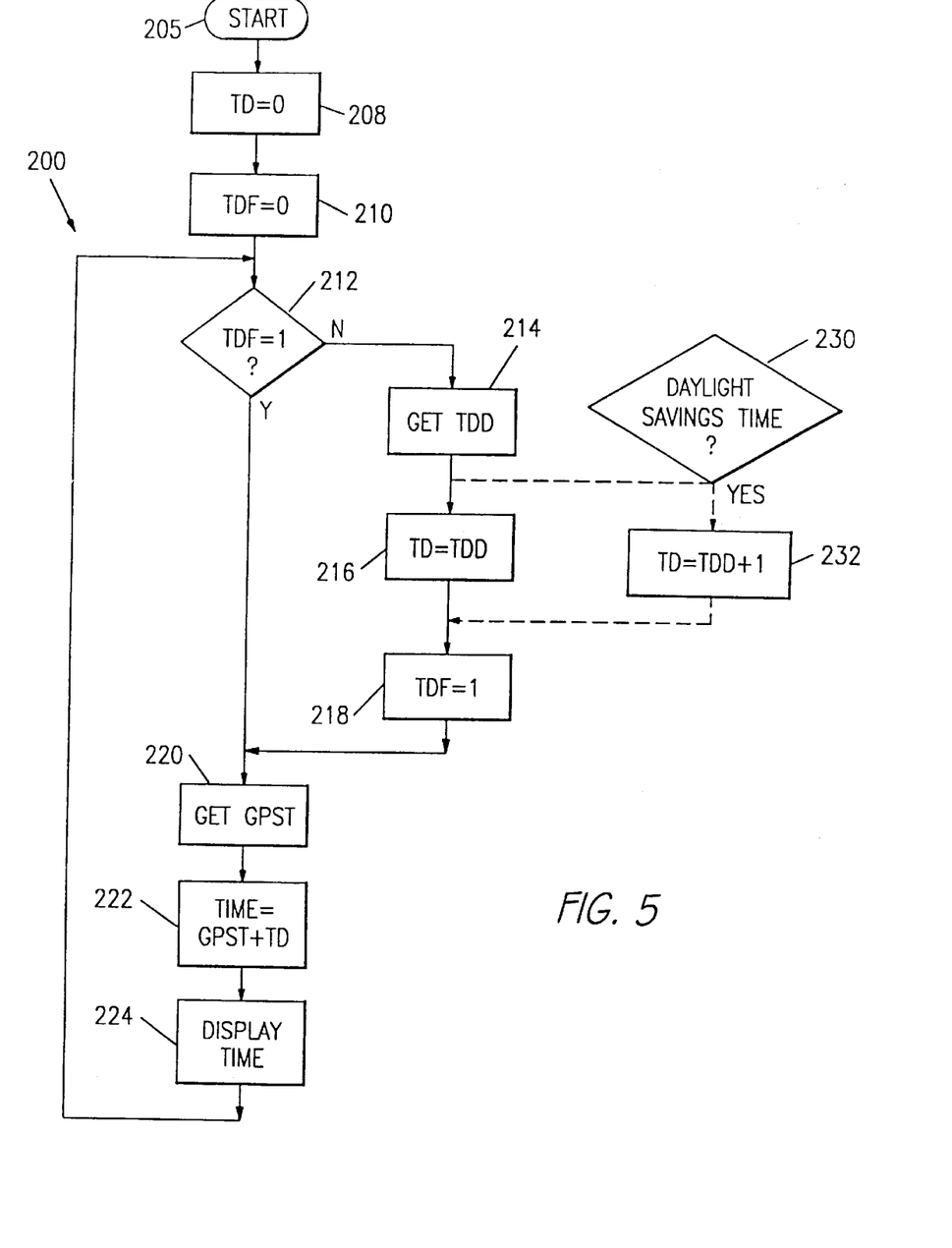
FIG. 5 is a flow chart of time adjustment scheme for the system according to one embodiment of the present invention.

The present inventor has determined that adjustment of the time zone or the time itself is somewhat inconvenient. Since the system is preferably connected to the GPS for positioning purposes, the system has access to a time signal representing Greenwich mean time. FIG. 5 is a flow chart illustrating a time adjustment method 200 for the system. At startup 205 of the vehicle (or alternately at given time increments) time zone adjustment factor TD is set to zero (step 208) and the time flag TDF is set to zero (step 210). If the time flag TDF equals zero as determined in step 212, the system obtains the time zone correction factor TDD from memory in step 214 (see Table A) corresponding to the known position of the vehicle:

TABLE A

| Time Zone | | Adjustment (TDD) |
|---|---|---|
| PST (Pacific Standard Time) | = | −8 |
| MST (Mountain Standard Time) | = | −7 |
| CST (Central Standard Time) | = | −6 |
| EST (Eastern Standard Time) | = | −5 |

Time zone adjustment factor TD is then set equal to TDD (step 216) and the time flag TDF is set equal to one (step 218). With TDF=1 from either step 212 or step 218, the system then retrieves the mean time GPST from the GPS (step 220) and then calculates adjusted local time: TIME= GPST+TD (step 222) and displays the time (step 224) and thereafter returns to step 212.

The time may be adjusted to accommodate daylight savings. FIG. 5 also illustrates an alternate embodiment whereby the system determines in step 230 whether or not the region in which the vehicle is located is on daylight savings time and if so adjusts the time zone adjustment factor (TD =TDD +1) in step 232. The system may be informed that daylight savings time applies by either manual user input or automatically. In the automatic system, the system memory may be provided with regional data with respect to which regions and over what periods of the year these regions go on daylight savings. In such an automatic system, the daylight savings correction could then be built into step 218 with the data in Table A containing all the necessary regional information including which regions go on daylight savings and when.

Figure 6:
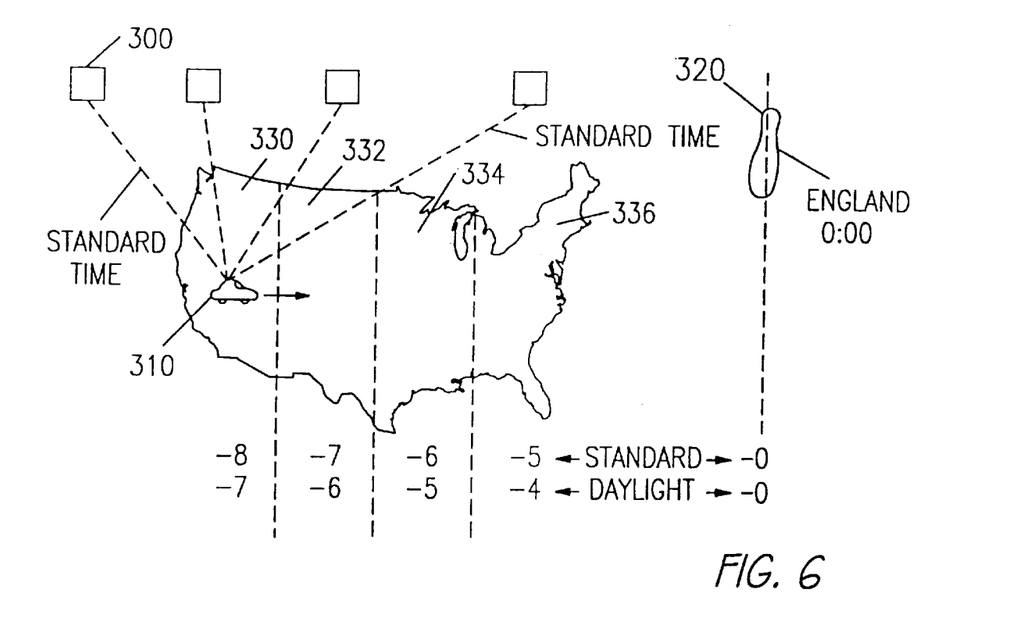
FIG. 6 is a diagrammatic representation of time global zones.
Figure 7:
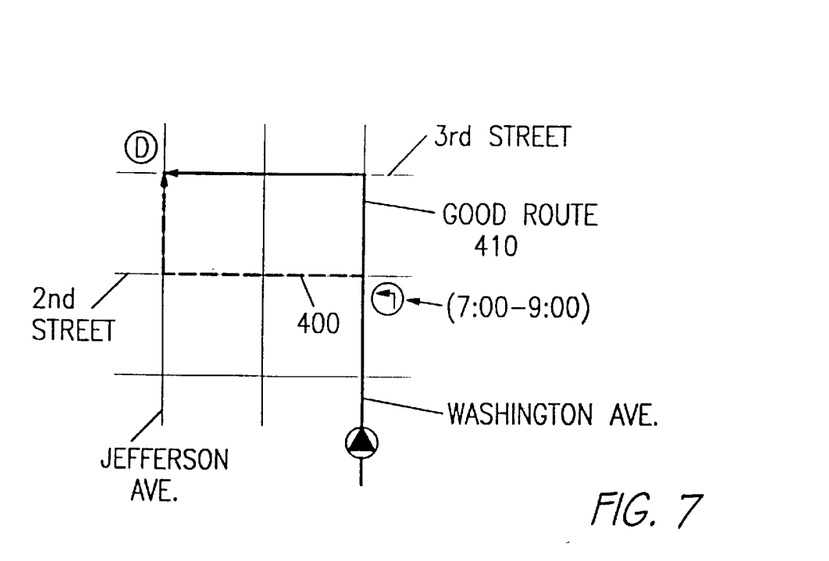
FIG. 7 is a diagrammatic representation of a map showing possible trip routes.

FIG. 6 illustrates a method by which the system determines regional time. The Global Positioning Satellite System 300 has orbital satellites which send signals which are detected by the receiver in the vehicle 310. By way of these signals, the vehicle position may be calculated by methods known to those skilled in the art. The mean time signal is also transmitted by these satellites, which is the time in Greenwich England 320, time zone 0:00. By knowing both the position of the vehicle and the geography of the regional time zones 330, 332, 334, 336 etc., the system has sufficient data to adjust to regional time as the vehicle moves between time zones. Time can also affect route calculations. FIG. 7 is a schematic of a map illustrating how time can be used to adjust trip route. The system memory may be provided with street restrictions data. For example, under normal conditions, the preferred direct trip route calculated by the navigation system to destination D would be along path 400, namely to turn left from Washington Avenue onto 2nd Street and then a right on Jefferson Avenue. However, the system memory 14 includes information of the time and the street restriction that no left turn is permitted from Washington Avenue onto 2nd Street between the hours of 7:00–9:00 pm. Knowing that the current time is 8 pm, for example, the system will determine the initial route 400 is not acceptable and recalculate a good route 410 to proceed on Washington Avenue and turn left onto 3rd Street to reach destination D.

The timing of route calculation may also be pertinent. In one example, the navigation system may calculate the route at 8:50 pm and determine the turn is restricted, but the vehicle would not reach the Washington Avenue/2nd Street intersection until after 9:00 pm when the left turn is not restricted. In another example, the system may calculate the route at 6:50 pm when it would determine that the left turn at the Washington Avenue/2nd Street intersection is permitted. However, if the distance from that intersection is such that the vehicle would not reach the intersection until 7:15 pm, the left turn would be restricted at the time the vehicle reaches the intersection. To avoid-such restrictions, the navigation system can incrementally monitor the time and vehicle location and modify the route if it is determined that the turn will be restricted (and alternately would not be restricted) when the vehicle reaches the intersection. The system may also be provided with speed and distance information such that estimated travel times can be calculated, adjusting the route according to turn restrictions at the estimated time the vehicle is calculated to reach the particular intersection.

Many other types of road data may be stored in the memory which can affect route calculation. Certain streets may have better timing of traffic signals at certain times of day which could impact route selection. Rush hour traffic patterns, road closures, car pool lane use or other factors dependent on time considerations may impact route selection.

With accurate time data, the system may also store in memory complete trip histories including trip route actually taken, vehicle velocity along the route, and date and time of day for locations along the trip route.

While embodiments and applications of this invention have been shown and described, it would be apparent to those skilled in the art that other modifications are possible without departing from the inventive concepts herein. The invention, therefore, is not to be restricted except in the spirit of the claims that follow.

What is claimed is:

1. A method of navigation for a vehicle equipped with a navigation system comprising the steps of:

storing in memory road data having routes that are undesirable for travel at particular times;

storing in memory geographical data corresponding to regional time zones;

storing in memory time zone adjustment factors corresponding to the regional time zones;

determining current location of the vehicle;

displaying a plurality of nearby regional time zones in which the vehicle may be located;

determining in which of the regional time zones the vehicle is currently located;

selecting an appropriate time zone adjustment factor corresponding to the regional time zone in which the vehicle is currently located; and adjusting the time setting of a system clock with the appropriate time zone adjustment factor.

2. A method according to claim 1 further comprising receiving a signal from a global positioning satellite system including time data of standard time, wherein the step of adjusting the time setting of the system clock comprises calculating local time by adding the appropriate time zone adjustment factor to the standard time.

3. A method according to claim 1 wherein the step of determining the regional time zone in which the vehicle is currently located comprises using the global positioning satellite system.

4. A method according to claim 1 further comprising calculating a trip route to a destination;

adjusting the trip route to the destination by comparing the road data and time to determine an optimal route that avoids roads that are undesirable for traveling during a specific period.

5. A method of navigation for a vehicle equipped with a navigation system comprising the steps of:

storing in memory road data having routes that are undesirable for travel at particular times;

storing in memory geographical data corresponding to regional time zones;

storing in memory time zone adjustment factors corresponding to the regional time zones;

determining in which of the regional time zones the vehicle is currently located by receiving a GPS signal;

selecting an appropriate time zone adjustment factor corresponding to the regional time zone in which the vehicle is currently located;

adjusting the time setting of a system clock by updating the system clock by obtaining Greenwich mean time signal from the GPS signal and using the appropriate time zone adjustment factor to adjust the time setting of the system clock for daylight savings.

6. A method according to claim 5 wherein said step of adjusting the time setting of the system clock for daylight savings includes storing in memory regions and periods in which the regions go on daylight savings;

determining whether or not the region in which the vehicle is located is on daylight savings time; and adjusting the time zone adjustment factor if it is determined that the region in which the vehicle is located is on daylight savings time.

7. A method of navigation for a vehicle equipped with a navigation system comprising the steps of:

storing in memory geographical data corresponding to regional time zones;

storing in memory time zone adjustment factors corresponding to the regional time zones;

determining in which of the regional time zones the vehicle is currently located;

displaying a plurality of possible regional time zones;

enabling a user to select one of said plurality of possible regional time zones;

selecting an appropriate time zone adjustment factor corresponding to the selected regional time zone;

adjusting the time setting of a system clock with the appropriate time zone adjustment factor.

8. A method of navigation for a vehicle equipped with a navigation system, comprising the steps of:

storing in memory geographical data corresponding to regional time zones;

storing in memory time zone adjustment factors corresponding to the regional time zones;

determining in which of the regional time zones the vehicle is currently located;

selecting an appropriate time zone adjustment factor corresponding to the regional time zone in which the vehicle is currently located;

adjusting the time setting of a system clock with the appropriate time zone adjustment factor;

calculating a trip route to a destination;

storing, in memory, road data that affects route calculation dependent on time; and adjusting the trip route to said destination by comparing the road data and time to determine an optimal route that avoids roads that are undesirable for traveling during a specific period and by incrementally monitoring the time and vehicle location and readjusting the trip route if it is determined that a portion of the trip route will be undesirable when the vehicle reaches that portion of the trip route.

9. A method according to claim 8 wherein the road data is provided with speed and distance information such that estimated travel times can be calculated.

10. A method according to claim 8 wherein the road data is provided with a trip history including the route actually taken, vehicle velocity along the route, and date and time of day for vehicle locations along the route.

11. A method according to claim 8 further comprising providing the road data with signal timing information about certain streets that may have better timing of traffic signals at particular times; and adjusting the trip route on the basis of the signal timing information.

12. A method according to claim 8 further comprising providing the road data with traffic congestion for particular times.

13. A method according to claim 12 further including the step of displaying the system clock on a map guide screen.

14. A method of navigation for a vehicle equipped with a navigation system, comprising the steps of:

storing, in memory, road data that affects route calculation dependent on time; and calculating a trip route to a destination;

adjusting the trip route to said destination by comparing the road data and time to determine an optimal route for traveling during a specific period;

incrementally monitoring the time and vehicle location and readjusting the trip route if it is determined that a turn will be permitted or restricted when the vehicle reaches an intersection.

15. A method of navigation for a vehicle equipped with a navigation system, comprising the steps of:

storing, in memory, road data that affects route calculation dependent on time;

calculating a trip route to a destination; and adjusting the trip route to the destination by comparing the road data and time to determine an optimal route that avoids roads that are undesirable for traveling during a specific period and by monitoring the time and vehicle location and readjusting the trip route if it is determined that time-dependent conditions at a portion of the trio route will be changed when the vehicle reaches that portion.

\* \* \* \* \*

UNITED STATES PATENT AND TRADEMARK OFFICE
CERTIFICATE OF CORRECTION

PATENT NO. : 5,842,146
DATED : November 24, 1998
INVENTOR(S) : Kan Shishido

It is certified that error appears in the above-indentified patent and that said Letters Patent is hereby corrected as shown below:

Column 2, line 63, delete "switch,106, the mapguide" and insert-- switch 106, the map/guide--.

Column 8, line 10, claim 15, delete "trio" and insert --trip--.

Signed and Sealed this

Sixteenth Day of November, 1999

Attest:

Attesting Officer

Q. TODD DICKINSON

Acting Commissioner of Patents and Trademarks